United States Patent
Tysowski et al.

(10) Patent No.: US 8,238,882 B2
(45) Date of Patent: Aug. 7, 2012

(54) SYSTEM AND METHOD FOR STORAGE OF ELECTRONIC MAIL

(75) Inventors: Piotr K. Tysowski, Waterloo (CA); Michael T. Hardy, Waterloo (CA); Tony Burns, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1693 days.

(21) Appl. No.: 11/551,009

(22) Filed: Oct. 19, 2006

(65) Prior Publication Data

US 2008/0095336 A1    Apr. 24, 2008

(51) Int. Cl.
*H04M 1/663* (2006.01)
*H04M 3/00* (2006.01)
*G06F 15/16* (2006.01)
*G06F 15/167* (2006.01)

(52) U.S. Cl. .................. 455/412.2; 455/420; 455/556.2; 455/566; 709/206; 709/216; 709/218; 709/219

(58) Field of Classification Search .................. 709/206, 709/216, 218, 219; 455/412.2, 420, 556.2, 455/557, 566; 379/88.11, 88.12, 88.13, 88.17
See application file for complete search history.

(56) References Cited

U.S. PATENT DOCUMENTS

| | | | |
|---|---|---|---|
| 5,684,990 A | | 11/1997 | Boothby |
| 5,844,969 A | * | 12/1998 | Goldman et al. ........... 379/93.24 |
| 5,933,478 A | * | 8/1999 | Ozaki et al. ................ 379/93.24 |
| 5,974,563 A | | 10/1999 | Beeler, Jr. |
| 5,995,554 A | | 11/1999 | Lang |
| 6,061,389 A | | 5/2000 | Ishifuji et al. |
| 6,212,529 B1 | | 4/2001 | Boothby et al. |
| 6,272,545 B1 | | 8/2001 | Flanagin et al. |
| 6,459,360 B1 | * | 10/2002 | Helferich ...................... 340/7.52 |
| 6,493,709 B1 | | 12/2002 | Aiken |
| 6,496,835 B2 | | 12/2002 | Liu et al. |
| 6,662,198 B2 | | 12/2003 | Satyanarayanan et al. |
| 6,705,781 B2 | * | 3/2004 | Iwazaki ......................... 400/62 |
| 6,751,298 B2 | * | 6/2004 | Bhogal et al. .............. 379/88.13 |
| 6,779,022 B1 | * | 8/2004 | Horstmann et al. .......... 709/206 |
| 6,892,221 B2 | | 5/2005 | Ricart et al. |
| 6,925,477 B1 | | 8/2005 | Champagne et al. |
| 6,944,782 B2 | | 9/2005 | von Mueller et al. |
| 6,968,209 B1 | | 11/2005 | Ahlgren et al. |
| 6,987,840 B1 | * | 1/2006 | Bosik et al. ................. 379/88.17 |

(Continued)

FOREIGN PATENT DOCUMENTS

EP    1522932 A    4/2005

(Continued)

OTHER PUBLICATIONS

European Patent Application No. 06790863.2 Examination Report dated Mar. 31, 2009.

(Continued)

*Primary Examiner* — Lisa Hashem

(74) *Attorney, Agent, or Firm* — Perry + Currier Inc.; Kristjan Spence

(57) ABSTRACT

A method of storage of an e-mail includes either receiving the e-mail at a portable electronic device or sending the e-mail from the portable electronic device. The e-mail is marked for saving at the portable electronic device and transmitted by radio communication for receipt by a server and for storage of the e-mail in a backup database.

15 Claims, 10 Drawing Sheets

U.S. PATENT DOCUMENTS

| | | | |
|---|---|---|---|
| 7,047,367 | B2 | 5/2006 | Nabekura et al. |
| 7,050,555 | B2 | 5/2006 | Zargham et al. |
| 7,113,981 | B2 * | 9/2006 | Slate .................. 709/217 |
| 7,240,041 | B2 | 7/2007 | Martin et al. |
| 7,259,886 | B2 * | 8/2007 | Iwase et al. .................. 358/1.15 |
| 7,317,907 | B2 | 1/2008 | Linkert et al. |
| 7,320,061 | B2 | 1/2008 | Yu et al. |
| 7,337,193 | B1 | 2/2008 | Mills et al. |
| 7,444,382 | B2 * | 10/2008 | Malik .................. 709/206 |
| 7,536,440 | B2 * | 5/2009 | Budd et al. .................. 709/206 |
| 7,739,334 | B1 * | 6/2010 | Ng et al. .................. 709/206 |
| 2001/0044805 | A1 | 11/2001 | Multer et al. |
| 2002/0065939 | A1 | 5/2002 | Liu |
| 2002/0068546 | A1 | 6/2002 | Plush et al. |
| 2002/0118476 | A1 | 8/2002 | Malone, Sr. |
| 2002/0136197 | A1 | 9/2002 | Owen et al. |
| 2003/0032404 | A1 | 2/2003 | Wager et al. |
| 2003/0037020 | A1 | 2/2003 | Novak et al. |
| 2003/0131025 | A1 | 7/2003 | Zondervan et al. |
| 2003/0159136 | A1 | 8/2003 | Huang et al. |
| 2003/0224760 | A1 * | 12/2003 | Day .................. 455/412.1 |
| 2004/0010628 | A1 | 1/2004 | Gillam et al. |
| 2004/0025072 | A1 | 2/2004 | Mau |
| 2004/0082347 | A1 | 4/2004 | Alminana et al. |
| 2004/0098556 | A1 | 5/2004 | Buxton et al. |
| 2004/0131081 | A1 | 7/2004 | Bhatia et al. |
| 2004/0199540 | A1 | 10/2004 | Nojima |
| 2004/0203579 | A1 | 10/2004 | Comp |
| 2004/0224672 | A1 | 11/2004 | Linkert et al. |
| 2004/0235523 | A1 * | 11/2004 | Schrire et al. .................. 455/558 |
| 2004/0248560 | A1 | 12/2004 | Bedingfield et al. |
| 2004/0259531 | A1 | 12/2004 | Wood et al. |
| 2005/0030229 | A1 | 2/2005 | Spilker, Jr. |
| 2005/0075097 | A1 | 4/2005 | Lehikoinen et al. |
| 2005/0192966 | A1 * | 9/2005 | Hilbert et al. .................. 707/10 |
| 2005/0198084 | A1 | 9/2005 | Kim |
| 2005/0213511 | A1 | 9/2005 | Reece, Jr. et al. |
| 2006/0105753 | A1 * | 5/2006 | Bocking et al. .................. 455/417 |
| 2006/0116113 | A1 | 6/2006 | Gass |
| 2006/0116162 | A1 * | 6/2006 | Desai et al. .................. 455/556.2 |
| 2007/0072588 | A1 * | 3/2007 | Gorty et al. .................. 455/412.1 |
| 2007/0083676 | A1 | 4/2007 | Rabbers et al. |
| 2007/0192743 | A1 * | 8/2007 | Lee .................. 715/828 |
| 2007/0226272 | A1 | 9/2007 | Huang et al. |
| 2008/0189425 | A1 | 8/2008 | Green |
| 2008/0201668 | A1 * | 8/2008 | Roy .................. 715/854 |
| 2008/0261564 | A1 * | 10/2008 | Logan .................. 455/413 |
| 2009/0042612 | A1 * | 2/2009 | Moran et al. .................. 455/557 |
| 2009/0075697 | A1 * | 3/2009 | Wilson et al. .................. 455/557 |
| 2009/0215478 | A1 * | 8/2009 | Leinonen et al. .................. 455/466 |
| 2009/0313348 | A1 * | 12/2009 | Plestid .................. 709/217 |
| 2010/0146133 | A1 * | 6/2010 | Perrin et al. .................. 709/229 |
| 2010/0255817 | A1 * | 10/2010 | Chen et al. .................. 455/412.2 |

FOREIGN PATENT DOCUMENTS

| | | |
|---|---|---|
| GB | 2366881 A * | 3/2002 |
| JP | 11249980 A * | 9/1999 |
| WO | 02061706 A1 | 8/2002 |
| WO | 2005041549 A1 | 5/2005 |
| WO | 2005045649 A1 | 5/2005 |
| WO | 2005057233 A2 | 6/2005 |

OTHER PUBLICATIONS

European Search Report of EP 06 79 0863 dated Aug. 29, 2008.

Corresponding Canadian Patent Application No. 2,564,676 Office Action dated Oct. 17, 2001.

* cited by examiner

SYSTEM AND METHOD FOR STORAGE OF ELECTRONIC MAIL

FIELD

The present application relates generally to electronic devices and to a system and method for storage of electronic mail.

BACKGROUND

Portable electronic devices such as wireless personal digital assistants (PDAs), smart telephones and laptop computers with wireless capabilities have gained widespread use for a variety of functions. Such devices are commonly used for communication purposes including transportation of data, and run on a wide variety of networks from data-only networks such as Mobitex and DataTAC to complex voice and data networks such as GSM/GPRS, CDMA, EDGE, UMTS and CDMA 2000 networks.

These portable electronic devices are commonly used for communication, for example, for sending and receiving electronic mail (e-mail), SMS messages (short message service, commonly referred to as text messages) and PIN messages (Personal Identification Number messages). For voice-enabled devices such as smart telephones for example, voice communication in the form of telephone calls can be initiated and received at the portable electronic devices.

Copies of e-mail messages sent and received are stored in a third-party database such as an Exchange™ database controlled by a server, for example, an Exchange™ server. During synchronization of a portable electronic device with a communication system connected to the Exchange server through a connector, the status of e-mails is synchronized as well as the folder in which e-mails are filed. For example, e-mails that are opened at the portable electronic device are deemed to be opened at the database. Changes in status such as a change from unopened to opened are therefore synchronized. With the exception of synchronization of the status of e-mails on the portable electronic device, e-mails on the Exchange™ database are not locally controlled by the portable electronic device.

BRIEF DESCRIPTION OF THE DRAWINGS

The system and method for communication record logging will be better understood with reference to the following description and to the Figures, in which.

DETAILED DESCRIPTION OF THE EMBODIMENTS

Figure 1:
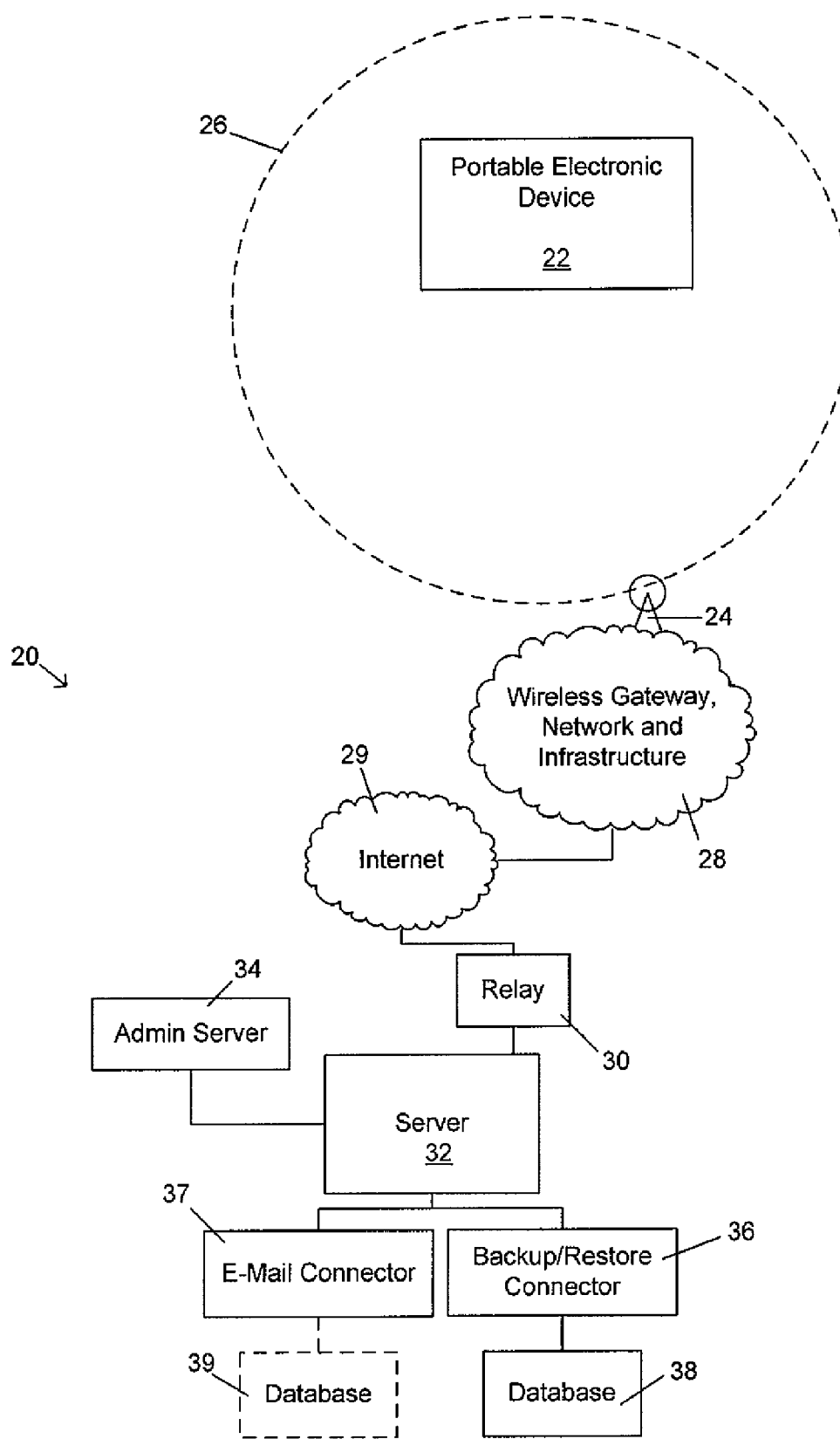
FIG. 1 is a functional block diagram of a communication system and portable electronic device for storage of electronic mail in accordance with one embodiment.

Reference is first made to FIG. 1, which shows a functional block diagram of a communication system indicated generally by the numeral 20 and a portable electronic device 22. The communication system 20 provides for communications with portable electronic devices including the exemplary portable electronic device 22, as shown. The portable electronic device 22 and the communication system 20 are operable to effect communications over a radio communications channel therebetween. Data originating at the portable electronic device 22 is communicated to the communication system 20 by way of the radio communications channel. Similarly, data originating at the communication system 20 is communicated from the communication system 20 to the portable electronic device 22 by way of the radio communications channel, thereby providing data to the portable electronic device 22.

For the purpose of illustration, the communication system 20 is functionally represented in FIG. 1 and a single base station 24 is shown. The base station 24 defines a coverage area, or cell 26 within which communications between the base station 24 and the portable electronic device 22 can be effectuated. It will be appreciated that the portable electronic device 22 is movable within the cell 26 and can be moved to coverage areas defined by other cells that are not illustrated in the present example. The communication system 20 includes a base station 24 that is part of a wireless network and infrastructure 28 that provides a link to the portable electronic device 22. The wireless network and infrastructure 28 includes a number of base stations (not shown) that provide the other cells referred to above. Data is delivered to the portable electronic device 22 via wireless transmission from the base station 24. Similarly, data is sent from the portable electronic device 22 via wireless transmission to the base station 24.

Wireless networks and infrastructures include, for example, data-centric wireless networks, voice-centric wireless networks, or dual-mode wireless networks. For the purpose of the present exemplary embodiment, the wireless network and infrastructure 28 includes a dual-mode wireless network that supports both voice and data communications over the same physical base stations.

The communication system 20 includes a relay device 30 that is connected to the Internet 29 that is, in turn, connected to the wireless network and infrastructure 28. The relay device 30 is also connected to a server 32. It will be understood that the functions provided by the relay device 30 and the server 32 can be embodied in the same device. The server 32 is also connected to an administration server 34, as shown.

The administration server 34 provides administrative services to and control over the server 32.

The server 32 is functionally coupled to an e-mail (for example, Exchange™) connector 37 for a third party database (for example, an Exchange-based database) 39. The connector 37 receives commands from the server 32. It will be understood that the connector 37 is a functional component and can be provided by way of an application on the server 32. Copies of e-mail messages sent from and received at the portable electronic device 22 are stored in the third-party database 39. During synchronization of the third-party database 39 and the portable electronic device 22, only status changes of e-mail messages are synchronized such that the status of e-mail messages at the portable electronic device 22 match the status of the e-mail message copies stored at the third-party database.

The server 32 is also functionally coupled through a backup/restore connector 36 to a backup/restore database 38. Other connectors and databases can be provided, for example, for synchronization purposes. For the purpose of simplicity, such connectors and databases are not shown in FIG. 1. The connector 36 receives commands from the server 32. Again, it will be understood that the connector 36 is a functional component and can be provided by way of an application on the server 32. The backup/restore database 38 is used for storing data records, including, for example, copies of e-mail messages sent from the portable electronic device 22 and received at the portable electronic device 22.

Figure 2:
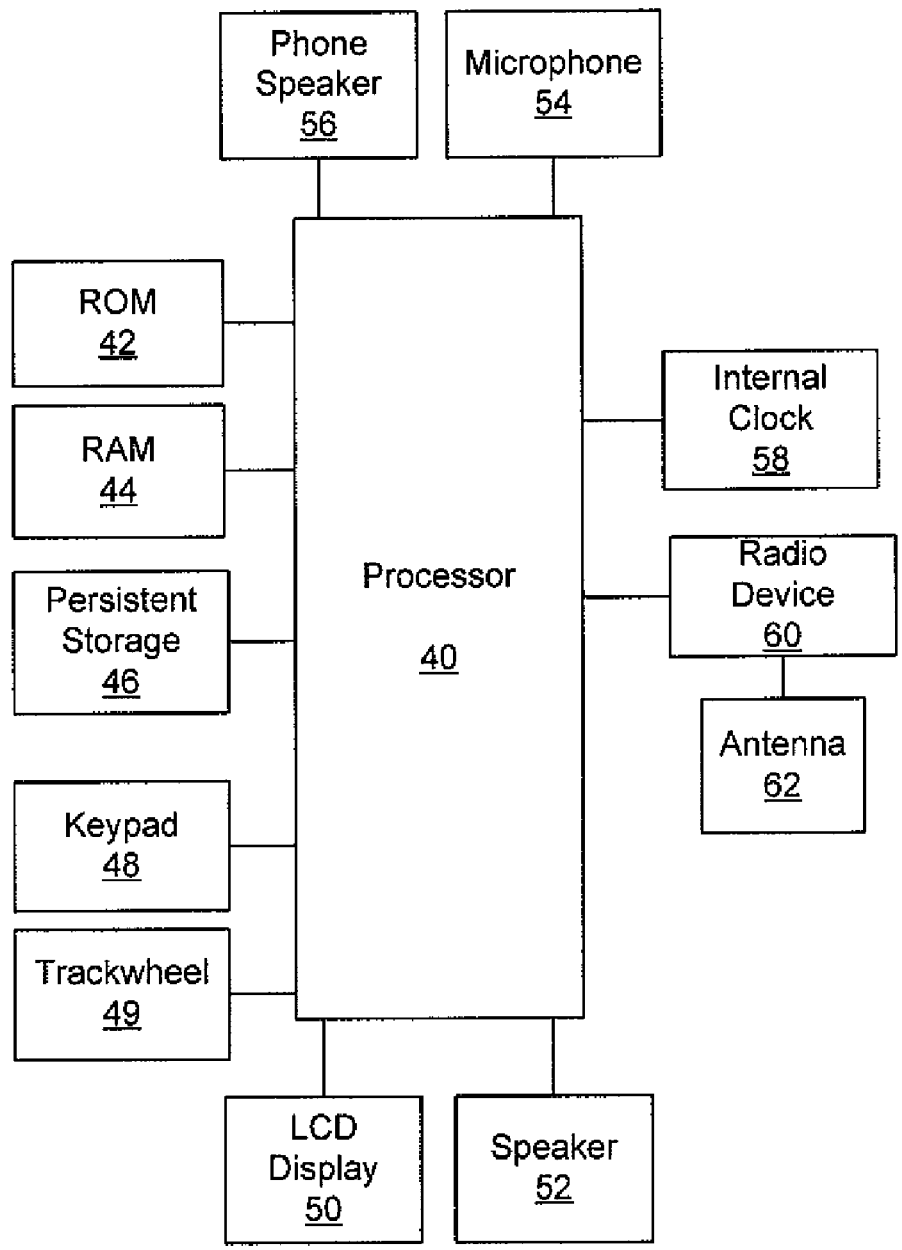
FIG. 2 is a block diagram of certain components within the electronic device of FIG. 1.

Referring now to FIG. 2, a block diagram of certain components within the portable electronic device 22 is shown. In the present embodiment, the portable electronic device 22 is based on the computing environment and functionality of a wireless personal digital assistant. It will be understood, however, that the portable electronic device 22 is not limited to a wireless personal digital assistant. Other portable electronic devices are possible, such as cellular telephones, smart telephones, and laptop computers. Referring again to the present embodiment, the portable electronic device 22 is based on a microcomputer including a processor 40 connected to a read-only memory (ROM) 42 that contains a plurality of applications including, for example, an e-mail messaging application, a Web browser application, an address book application, a tasks application, a memo pad, a calendar application and others. The applications are executable by the processor 40 to enable the portable electronic device 22 to perform certain functions including, for example, e-mail message functions. The processor 40 is also connected to a random access memory (RAM) unit 44 and a persistent storage device 46 which are responsible for various non-volatile storage functions of the portable electronic device 22. The processor 40 receives input from various input devices including a keypad 48 and a trackwheel 49 or trackball (not shown). The processor 40 outputs to various output devices including an LCD display 50 and a speaker 52. A microphone 54 and phone speaker 56 are connected to the processor 40 for cellular telephone functions. The processor 40 is also connected to an internal clock 58 and a modem and radio device 60. The modem and radio device 60 is used to connect to wireless networks using an antenna 62. The modem and radio device 60 transmits and receives voice and data communications to and from the portable electronic device 22 through the antenna 62.

The portable electronic device 22 is operable to effect two-way communication of voice and data. Thus, the portable electronic device 22 transmits and receives voice communications over the wireless network and infrastructure 28 via wireless communications with the base station 24 over a radio communications channel. Similarly, the portable electronic device 22 transmits and receives data communications over the wireless network and infrastructure 28 via wireless radio communications with the base station 24 over a radio communications channel.

Figure 3:
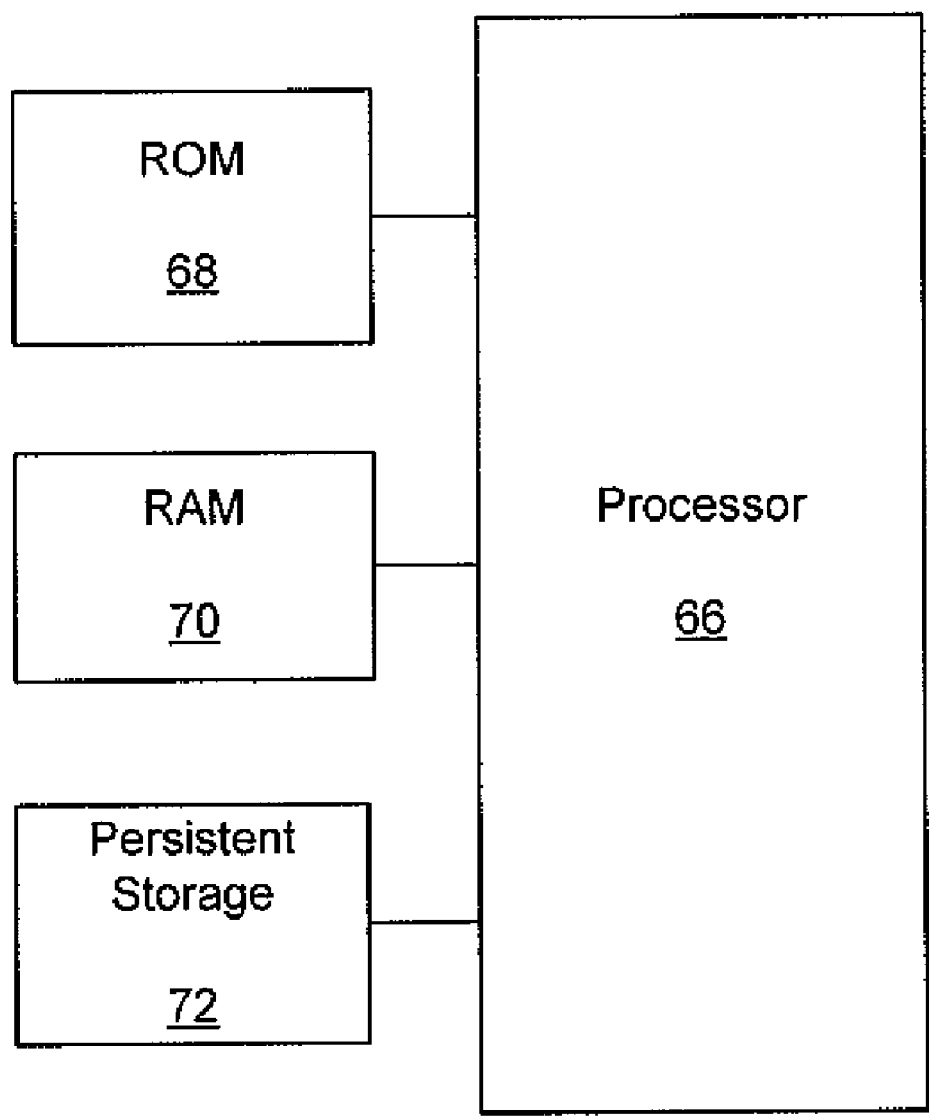
FIG. 3 is a block diagram of certain components within the synchronization server of FIG. 1.

Reference is now made to FIG. 3 which shows a block diagram of certain components within the server 32. Similar to the portable electronic device 22, the server 32 includes a processor 66 connected to a read-only memory (ROM) 68 that includes applications executable by the processor 66 and enables the server 32 to perform certain functions including backing up data from the portable electronic device 22. The processor 66 is also connected to a random access memory (RAM) unit 70 and a persistent storage device 72 which are responsible for various storage functions of the server 32.

It will be understood that the functions described herein can be carried out in any suitable manner. In the present example, the functions are carried out by algorithms executable by the processor 66. For example, the processor 66 of the server 32 is operable to receive communications generated by the portable electronic device 22 for delivery to other electronic devices. The processor 66 is operable to store e-mail messages in a backup/restore table in a backup/restore database and to delete the e-mail messages from the backup database.

The portable electronic device 22 is operable to send and receive a variety of different communication types including e-mail messages from other portable electronic devices (not shown) connected to the wireless network and infrastructure 28.

It will be appreciated that the portable electronic device 22 and server 32 are operable to carry out many other functions, some of which are described below.

Figure 4:
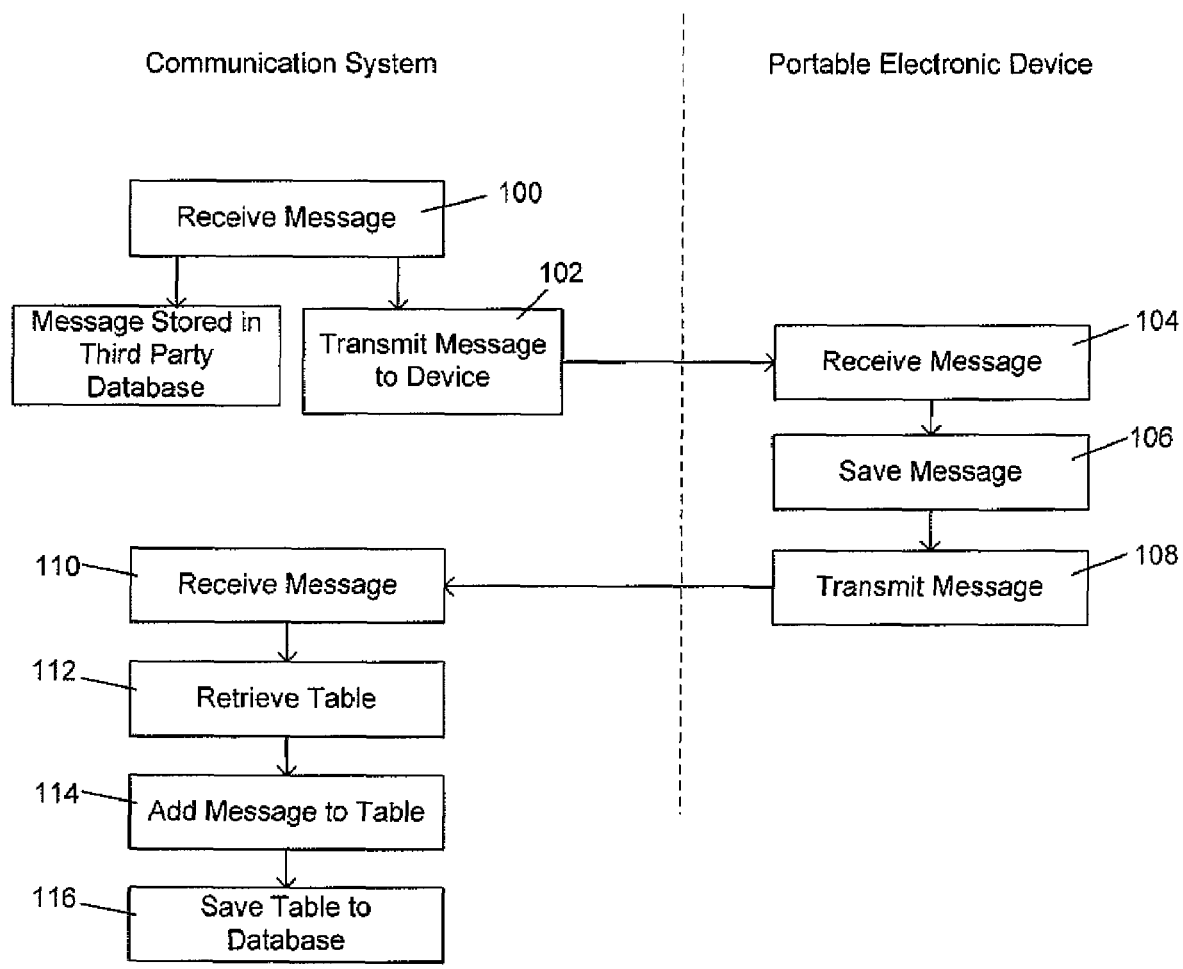
FIG. 4 is a sequence diagram illustrating functions carried out at both the portable electronic device and the communication system of FIG. 1, during storage of electronic mail according to one example.

Reference is now made to FIG. 4, which shows a sequence diagram illustrating functions carried out at both the portable electronic device 22 and the communication system 20 for storage of electronic mail according to one example of an embodiment of the present application. Coding of software for carrying out the steps illustrated is well within the scope of a person of ordinary skill in the art. In the present example, an e-mail message is received at the portable electronic device 22, from another electronic device. The e-mail message is composed and sent from the other electronic device (not shown) connected through the internet 29 and the relay 30 to the server 32. The e-mail message is received at the server 32 at step 100. A copy of the e-mail message is forwarded and stored in the Exchange™ database 39, as will be understood by those skilled in the art. A copy of the e-mail message is also processed by the server 32 for transmission to the portable electronic device 22 and routed from the server 32, through the relay 30, the Internet 29 and the wireless network and infrastructure 28, to the base station 24 for transmission via a radio communication channel to the portable electronic device 22 at step 102. It will be appreciated that the e-mail message is forwarded to the base station 24 covering the cell in which the portable electronic 22 device is located.

Figure 5:
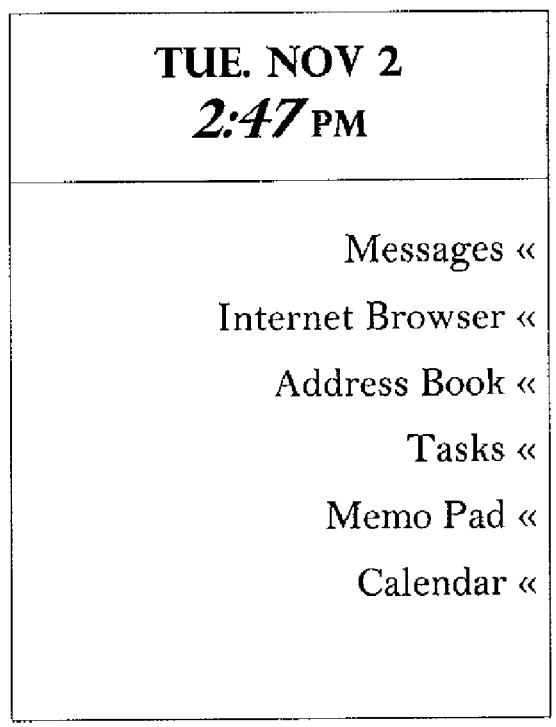
FIG. 5 shows a menu screen of an LCD display of the electronic device of FIG. 1.

The e-mail message is received at the portable electronic device 22 at step 104. In the present example, the portable electronic device emits a notification such as an e-mail-specific ring tone through the speaker 52, thereby notifying the user of receipt of an e-mail message at the portable electronic device 22. Referring to FIG. 5, there is shown an exemplary menu screen that is displayed on the LCD display 50 of the portable electronic device 22. The exemplary menu screen includes a display clock that is updated according to the internal clock 58, and applications including an e-mail Messaging application, a Web browser, an Address book, a Tasks application, a Memo application and a Calendar, The user views the e-mail message by scrolling through the applications using the trackwheel 49 or a trackball and pressing inwardly on the trackwheel 49 or trackball to select the e-mail messaging application. Selection of the e-mail messaging application causes execution of the e-mail messaging application and a list of e-mail messages is displayed, including previously sent and received, opened and unopened e-mail messages that remain on the portable electronic device, as shown in the exemplary messaging applications screen of FIG. 6.

Upon selection of an unopened e-mail message from the menu list screen, a submenu is displayed on the LCD display 50, displaying different options for user selection, including, for example, Open, Mark Opened, Save, Reply, Forward, Delete, Compose, View Saved Messages and Close. Referring, for exemplary purposes, to selection of the e-mail received at step 104, the selection of this e-mail gives rise to the submenu options Open, File, Mark Opened, Save, Reply, Forward, Delete, Compose, and Close, as shown in FIG. 7. Many of these options will be understood by those skilled in the art. For example, selection of the Open option opens the e-mail for viewing on the LCD display 50. Selection of the Mark Opened option marks the e-mail as opened on the list of e-mail messages screen of FIG. 6 and closes the submenu shown in FIG. 7, returning to the list of e-mail messages. Selection of the Reply option initiates a new reply e-mail composition that is automatically addressed to the sender of the selected e-mail and includes the same subject line in the e-mail header. Selection of the Forward option initiates a new forward e-mail composition that incorporates in the new subject line the e-mail header of the selected e-mail. Selection of the Delete option deletes the e-mail from the list of e-mail messages screen. Selection of the Compose option initiates a new e-mail composition. Selection of the Close option closes the e-mail application and returns control to the menu screen shown in FIG. 5. It will be appreciated that if an e-mail message marked as opened is selected, the Open and Mark Opened options are not provided in the submenu shown in FIG. 7. Instead, a Mark Closed option is provided.

Selection of the Save option from the submenu options shown in FIG. 7 marks the selected message as saved by changing an indicator, such as a bit flag, on the e-mail such that during scheduled clean-up and memory management options, the e-mail marked as saved remains on the portable electronic device 22. Those e-mails not marked as saved are subject to deletion during clean-up and memory management operations. Such clean-up operations can be regularly carried out, for example, based on age of unmarked e-mail messages, based on the number of e-mail messages or size of e-mail messages in an "inbox" in the portable electronic device 22, or during low-memory conditions at the portable electronic device 22. Thus, an e-mail that is more than 60 days old, for example, and that is not marked as saved, is deleted from the portable electronic device 22. The corresponding copy of the e-mail message stored in the Exchange™ database 39 is not deleted when the e-mail is deleted from the portable electronic device 22. It will be understood, however, that no further status updates are sent from the server to the portable electronic device 22. In this case the server is notified of the deletion on the portable electronic device 22 and therefore no further updates are sent for a deleted message.

Referring again to FIG. 4, the e-mail message received at step 104 is marked as saved at step 106 by user selection of the e-mail messaging application from the menu screen, followed by user selection of the e-mail message from the list of e-mail messages and user-selection of the Save option in the submenu, as described above. Upon selection of the Save option, the e-mail is marked as saved as described above and a copy of the saved e-mail is transmitted over a radio communication channel from the portable electronic device 22 for delivery to the server 32 at step 108.

The e-mail message is received at the base station 24 at step 110 and forwarded through the wireless network and infrastructure 28, the internet 29 and the relay 30 to the server 32 of the communication system 20. The copy of the e-mail message is then stored by the server, in the backup/restore database 38 via the backup/restore connector 36. The copy of the e-mail message is stored in a backup/restore table on the backup/restore database 38. This is accomplished by first retrieving the backup/restore table from the backup/restore database 38 at step 112. The table includes e-mail message data including the fields from the e-mail identified by length and unique tag numbers. Such fields include, for example information regarding the sender (e-mail source), the recipient, the length of the e-mail message, a time stamp, the body of the message, a unique numeric e-mail identifier and others. The server adds the information in the form of contiguous binary data to the backup/restore table at step 114 and stores the table in the backup/restore database at step 116.

Although the backup/restore table stored in the backup/restore database 38 is not accessible to the user of the portable electronic device 22, the backup/restore database 38 is used to restore data to the portable electronic device 22 in the event of loss of data at the portable electronic device 22. Thus, in the event of memory loss at the portable electronic device 22, a synchronization session is invoked and the data stored in the backup/restore database 38 is restored on the portable electronic device 22, thereby restoring all e-mail records previously marked as saved by the user.

Figure 7:
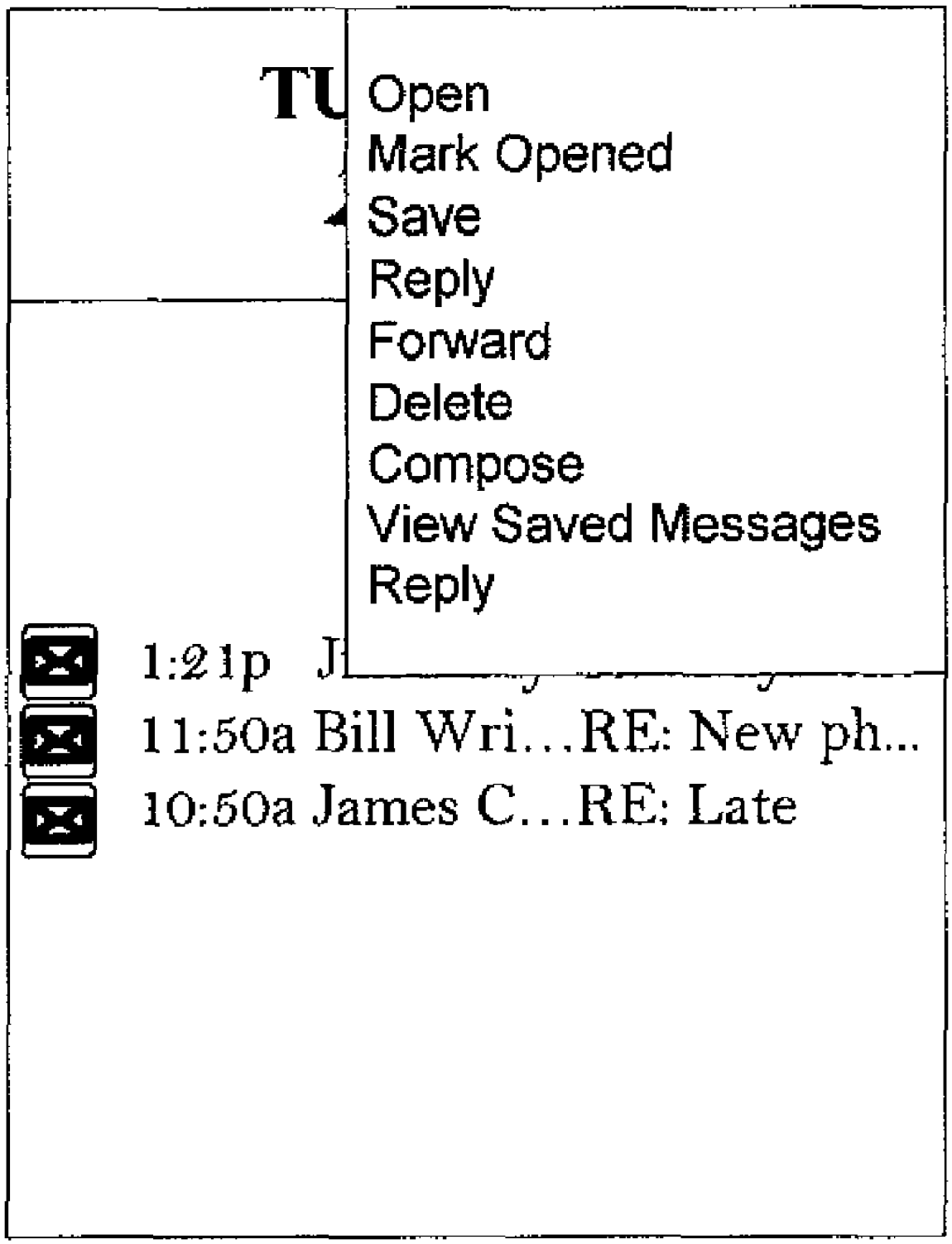
FIG. 7 shows a list of electronic mail messages including a submenu screen of the LCD display of the electronic device of FIG. 1.
Figure 8:
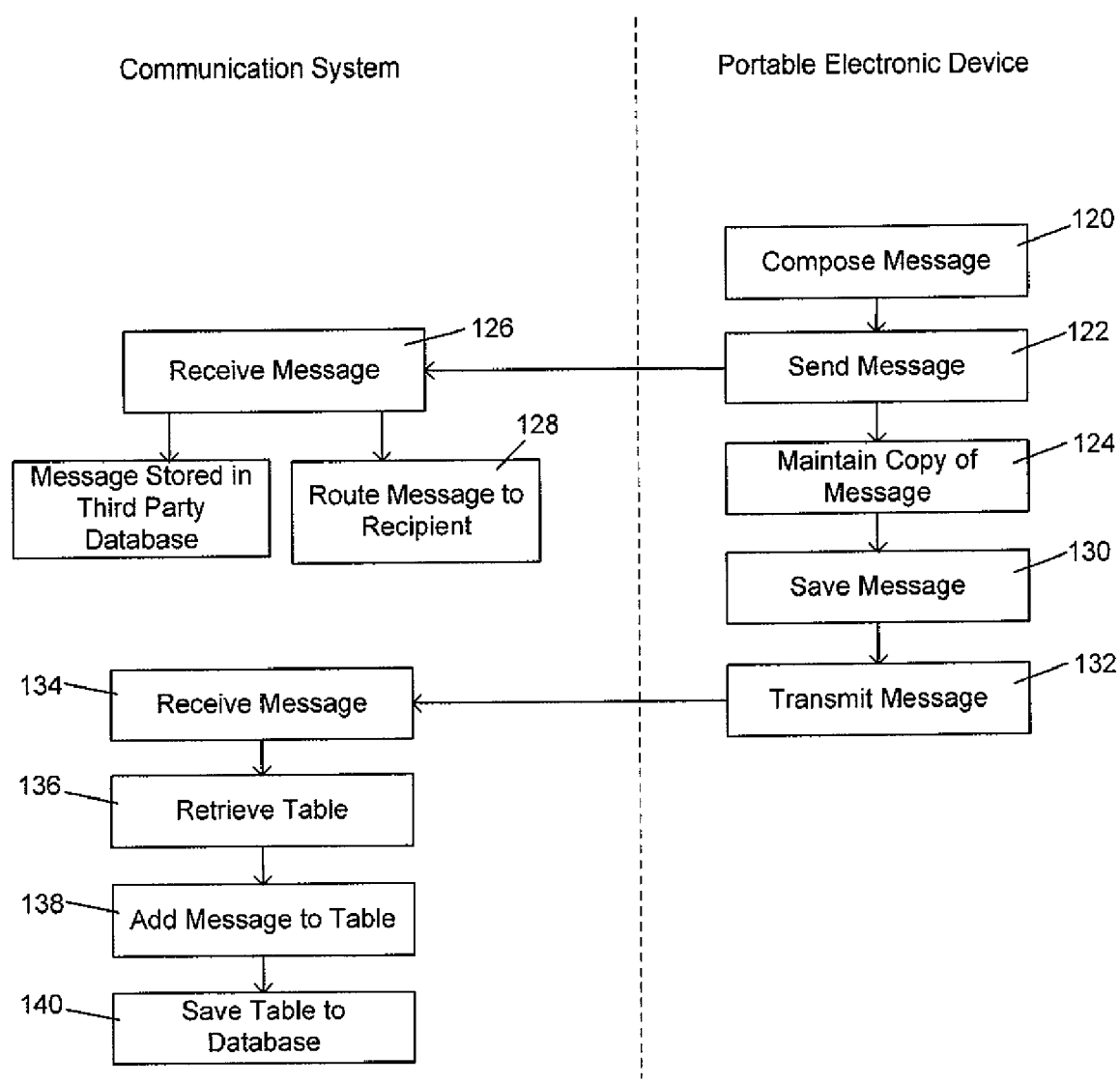
FIG. 8 is a sequence diagram illustrating functions carried out at both the portable electronic device and the communication system of FIG. 1, during storage of electronic mail according to another example.

Reference is now made to FIG. 8, which shows a sequence diagram illustrating functions carried out at both the portable electronic device 22 and the communication system 20 for storage of electronic mail according to another example of an embodiment. Coding of software for carrying out the steps illustrated is well within the scope of a person of ordinary skill in the art. In the present example, an e-mail message is composed by the user of the portable electronic device 22 and sent to another electronic device. In order to send an e-mail message using the portable electronic device 22, the e-mail messaging application is selected from the menu screen shown in FIG. 5, using the trackwheel 49, as described above with reference to the first-described exemplary embodiment. For the purpose of the present example, the compose e-mail option is chosen from the submenu screen shown in FIG. 7 after selection of one of the e-mail messages in the list of e-mail messages. The e-mail is then composed using the keypad 48 (step 120). The destination e-mail address is entered and the message is sent by selection of a send command from another submenu, using the trackwheel 49. The e-mail message is then sent via a radio communications channel to the base station 24 (for the cell in which the portable electronic device 22 is located) for delivery to the server 32, at step 122. Upon sending the e-mail from the portable electronic device 22, a copy of the e-mail message is maintained at the portable electronic device 22 and is displayed in the list of e-mail messages described with reference to FIG. 6 (step 124).

Referring again to FIG. 8, the e-mail message is received at the base station 24 and forwarded through the wireless network and infrastructure 28, the internet 29, and the relay 30, to the server 32 of the communication system 20 at step 126. A copy of the e-mail message is processed by the server 32 and forwarded and stored in the Exchange™ database and the message is routed through the internet 29 for delivery to the destination electronic device at step 128.

In the present example, the e-mail message that is maintained at the portable electronic device 22 is marked as saved at step 130 by user selection of the e-mail message from the list of e-mail messages and user-selection of the Save option in the submenu, as described above. Upon selection of the Save option, the e-mail is marked as saved as described above and a copy of the saved e-mail is transmitted over a radio communication channel from the portable electronic device 22 for delivery to the server 32 at step 132.

The copy of the e-mail message is received at the base station 24 and forwarded through the wireless network and infrastructure 28, the Internet 29 and the relay 30 to the server 32 of the communication system 20, at step 134. Upon receipt of the copy of the e-mail message at the server 32, the backup/restore table is retrieved from the backup/restore database 38 at step 136. Again, the server 32 extracts e-mail information from individual fields of the copy of the e-mail message, adds the information to the backup/restore table at step 138 and stores the table in the backup/restore database at step 140.

It will be appreciated that selection of the Save option from the submenu options shown in FIG. 7 marks the sent message as saved such that during scheduled clean-up and memory management options, the e-mail marked as saved remains on the portable electronic device 22. Further, in the event of memory loss at the portable electronic device 22, a synchronization session can be invoked to restore the data stored in the backup/restore database 38 to the portable electronic device 22, thereby restoring all e-mail records previously marked as saved by the user.

Selection of the View Saved Messages option from the submenu of FIG. 7 results in a list of e-mail messages marked as saved at the portable electronic device 22. Thus, only those e-mail messages marked as saved are displayed.

Figure 9:
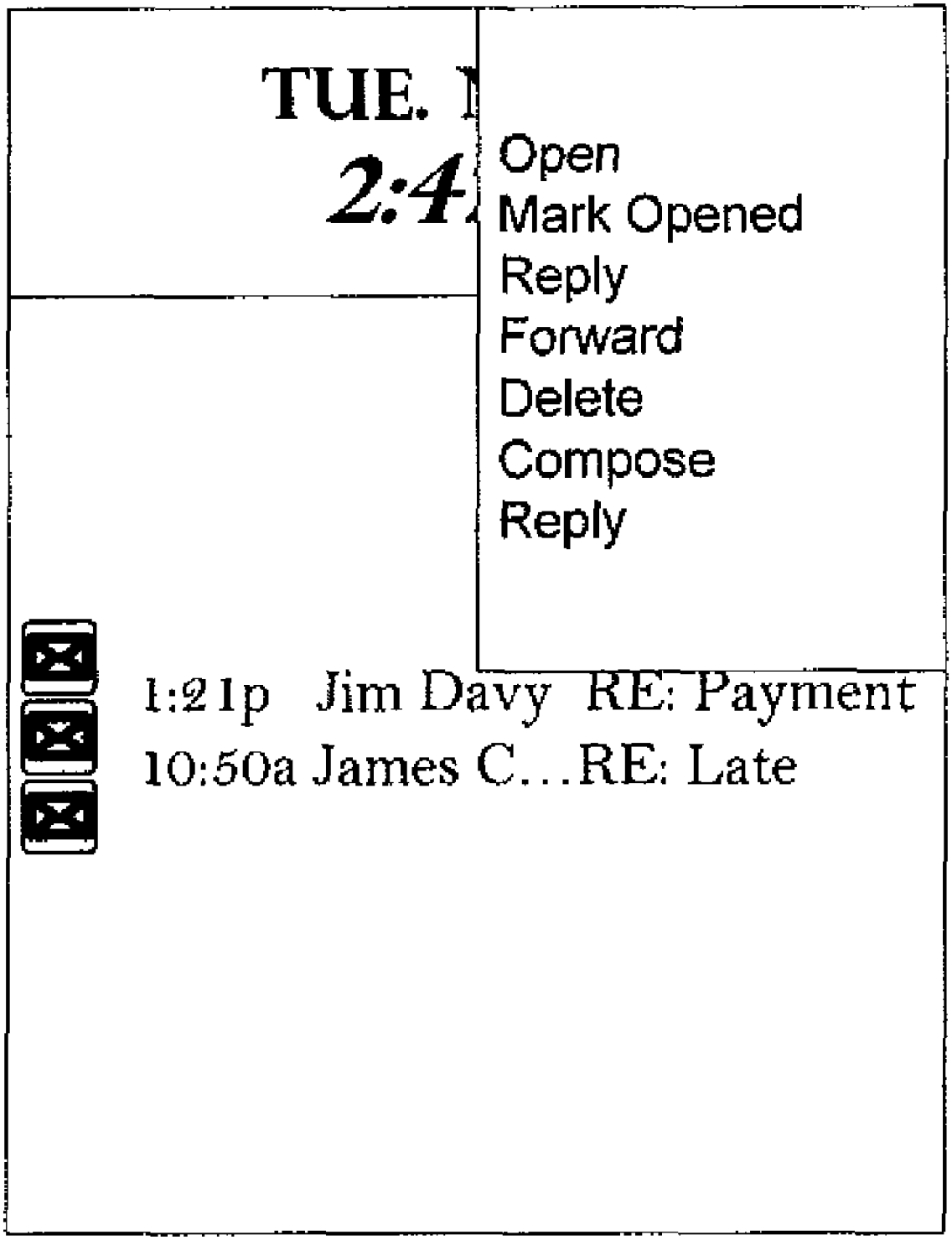
FIG. 9 shows a list of saved electronic mail messages including a submenu screen of the LCD display of the electronic device of FIG. 1.

Upon selection of a saved message from the list of e-mail messages marked as saved at the portable electronic device 22, a saved messages submenu is displayed on the LCD display 50, displaying different options for user selection, including, for example, Open, Mark Opened, Reply, Forward, Delete, Compose, and Close. Referring, for exemplary purposes, to selection of the e-mail marked as saved in the embodiment described above with reference to FIG. 4, the selection of this e-mail gives rise to the saved messages submenu options, as shown in FIG. 9. Again, many of these options will be understood by those skilled in the art and are described above. It will also be appreciated that if an e-mail message marked as opened is selected, the Open and Mark Opened options are not provided. Instead, a Mark Closed option is provided. In the present example, selection of the Delete option removes the saved message mark by changing a bit flag on the e-mail message, resulting in removal of the saved message from the list of e-mail messages marked as saved at the portable electronic device 22. The e-mail message is still displayed in the list of e-mail messages described above and shown in FIG. 6, however.

Figure 10:
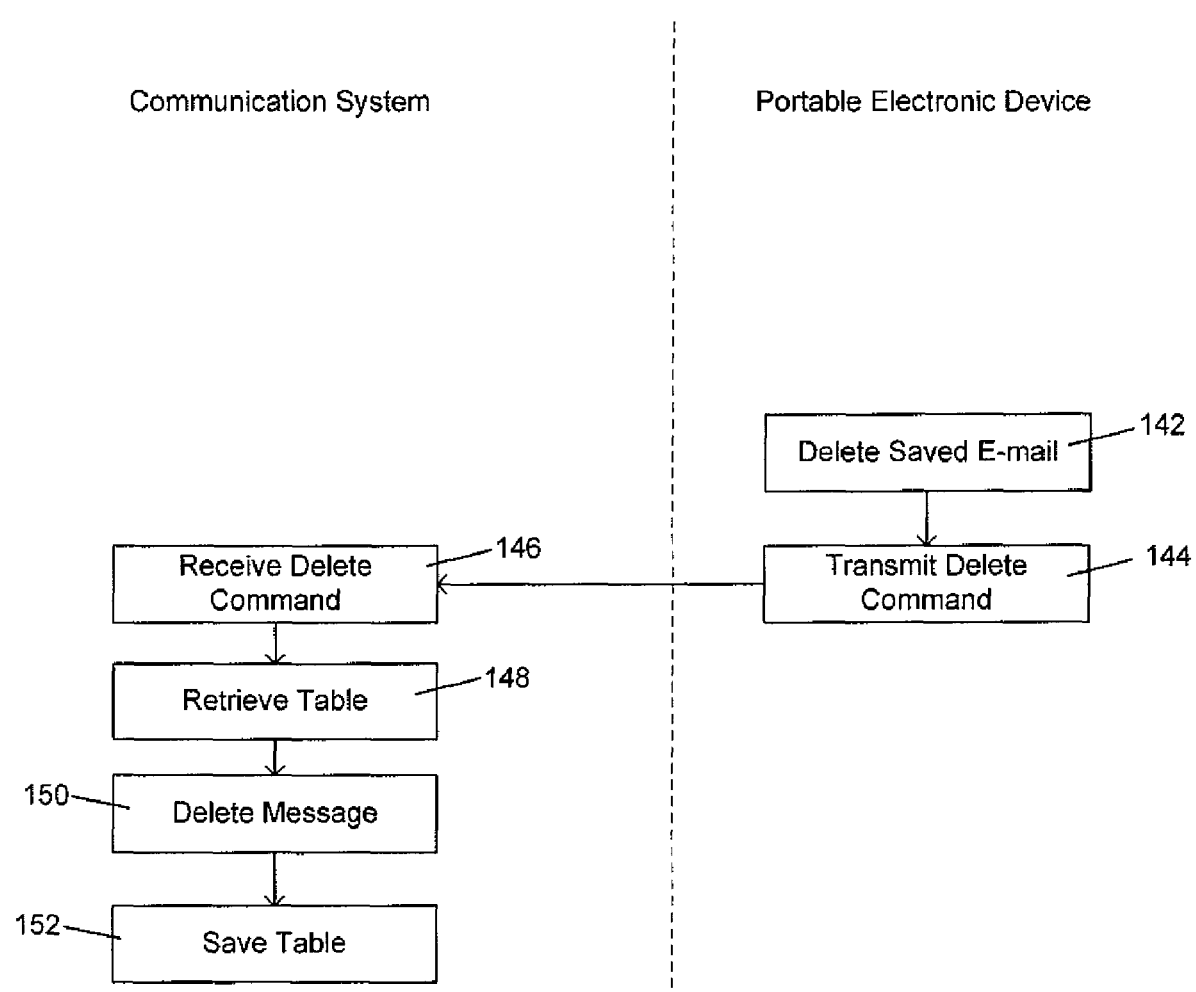
FIG. 10 is a sequence diagram illustrating functions carried out at both the portable electronic device and the communication system of FIG. 1 during removal of an electronic mail message from storage according to one example.

Selection of the Delete option from the saved messages submenu for the selected e-mail message marked as saved at the portable electronic device 22 also results in deletion of the e-mail message information stored in the backup/restore table of the backup/restore database. Referring now to FIG. 10, a sequence diagram is shown which illustrates functions carried out at both the portable electronic device 22 and the communication system 20 during deletion of e-mail from the backup/restore database according to one aspect of an embodiment. Coding of software for carrying out the steps illustrated is well within the scope of a person of ordinary skill in the art. The e-mail message saved, for example, at step 106 is then deleted from the saved messages by user selection of the Delete option from the submenu of FIG. 9. As described, the e-mail message is deleted from the saved messages, changing the bit flag on the e-mail message and resulting in removal of the saved message from the list of e-mail messages marked as saved at the portable electronic device 22. Upon selection of the Delete option, a delete message command is also transmitted over a radio communication channel from the portable electronic device 22 for delivery to the server 32 at step 152.

The delete message command is received at the base station 24 and forwarded through the wireless network and infrastructure 28, the internet 29 and the relay 30 to the server 32 of the communication system 20, at step 154. The copy of the e-mail message previously stored by the server 32 in the backup/restore database 38 via the backup/restore connector 36 is then deleted from the backup/restore table. To delete the copy of the e-mail message, the backup/restore table is retrieved from the backup/restore database 38 at step 156. The server 32 deletes the information related to the e-mail selected for deletion in the saved messages, from the backup/restore table at step 158 and stores the table in the backup/restore database at step 160.

With the e-mail message no longer marked as saved (deleted from the saved messages menu), the e-mail message still exists on the portable electronic device 22 and is displayed in the list of e-mail messages described above with reference to FIG. 6, until the e-mail message is deleted from the list of e-mail messages by selection of the Delete option from the submenu described with reference to FIG. 7, or until the e-mail is deleted during a clean-up or memory management operation.

In the example described above with reference to FIG. 10, the e-mail message is removed from the saved messages prior to deletion of the e-mail message from the list of e-mail messages shown and described with reference to FIG. 6. The e-mail message can be deleted from the list of e-mail messages by selection of the Delete option from the submenu of FIG. 7, while still retaining the message in the saved messages list. In this case, a copy of the e-mail message is saved in a collection of e-mail messages for which the parent e-mail message has been deleted. Therefore, the e-mail message is not displayed in the list of e-mail messages of FIG. 7. When the user selects the View Saved Messages option of FIG. 7, however, the saved messages list includes two collections of saved messages, including all those messages that are still present in the list of e-mail messages of FIG. 6 that have been marked as saved, and all those messages saved in the collection of e-mail messages that have been marked as saved and for which the parent e-mail message has been deleted.

Figure 6:
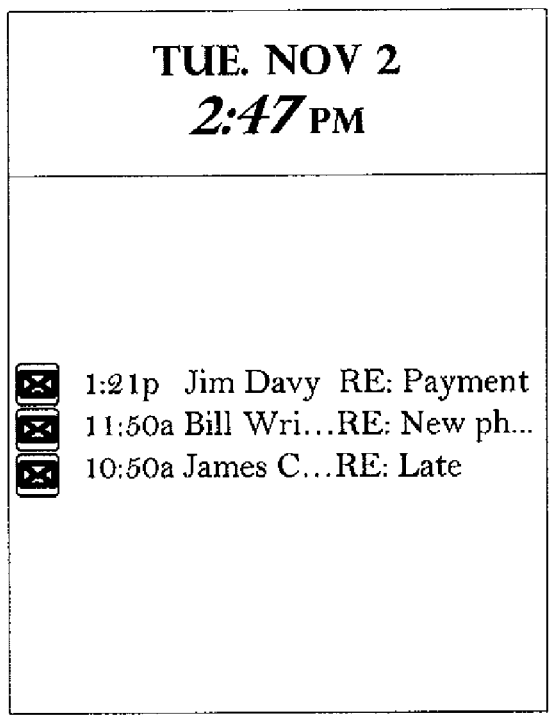
FIG. 6 shows a list of electronic mail messages screen of the LCD display of the electronic device of FIG. 1.

For those e-mail messages that are saved in the collection of e-mail messages that have been marked as saved and for which the parent e-mail message has been deleted, the message does not appear in the list of e-mail messages of FIG. 6. In this case, selection of the Delete option in the saved messages submenu of FIG. 9 does not simply result in changing the bit flag on the e-mail message. Instead, selection of the Delete option results in deletion of the e-mail from the portable electronic device.

Figure 11:
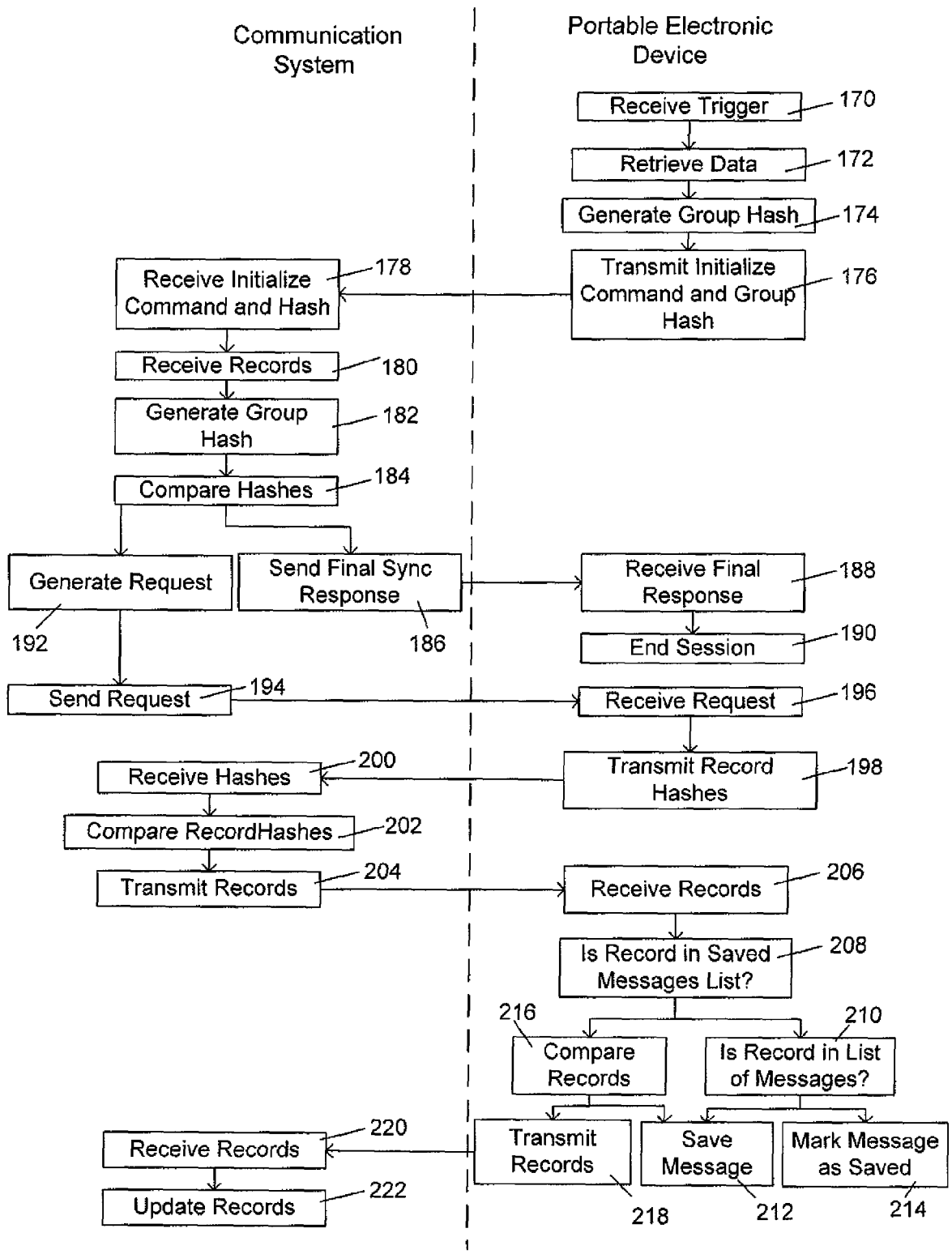
FIG. 11 is a sequence diagram illustrating functions carried out at both the portable electronic device and the communication system of FIG. 1 during restore of electronic mail to the portable electronic device of FIG. 1.

Reference is made to FIG. 11 to describe a restore operation to restore saved messages to the portable electronic device 22. Coding of software for carrying out such steps is well within the scope of a person of ordinary skill in the art. The portable electronic device 22 receives a restore trigger at step 170, by, for example, selection of a restore option on the LCD display device 50. It will be understood that such a restore operation is selected, for example, in the event that data is lost from the portable electronic device 22. In response to receipt of the restore trigger, the processor 40 retrieves any e-mail message records from the folder of the database on which the saved e-mail records are stored in the portable electronic device 22, at step 172. The processor 40 generates a record hash for each e-mail message marked as saved at the portable electronic device 22 and then generates a group hash for the folder, based on the individual record hashes at step 174. Next, an initialize command is transmitted along with the group hash, from the portable electronic device 22 to the communication system 20 over a radio communication channel, at step 176. The initialize command initiates the restore process at the server 32, identifies the e-mail backup/restore database 38 for restoring and provides session state information including a session state identifier. The portable electronic device 22 then awaits a response from the communication system 20.

The communication system 20 receives the initialize command along with the group hash at step 178 by receipt at the base station 24. The base station 24 forwards the initialize command and the group hash to the server 32. As indicated above, the initialize command identifies the database for restore and provides session state information including the session state identifier. A session is thereby started with the portable electronic device 22. In response to receipt of the initialize command, the server 32 retrieves the backup/restore table stored in the backup/restore database 38 via the backup/restore connector at step 180. Next, the processor 66 of the server 32 generates record hashes, each record hash being generated from the fields of the individual e-mail records saved in the backup/restore table of the backup/restore database 38. From the record hashes, a group hash, referred to herein as the locally generated group hash, is generated at step 182. After generation of the locally generated group hash, the hash information of the group hash received from the portable electronic device 22 is compared with the hash information of the corresponding locally generated group hash at step 184. If the comparison of the hash information indicates that the saved e-mail records stored in the database 40 on the portable electronic device 22 are not in mismatch with the corresponding e-mail records stored in the backup/restore table on the backup/restore database 38, then a response is sent to the portable electronic device 22 to terminate the backup/restore session at step 186.

The response is received at the portable electronic device 22 at step 188 and the backup/restore session is terminated at step 190.

If, on the other hand, the comparison of the hash information indicates that the e-mail message records are in mismatch, then a request for additional hash information is generated by the server 32 at step 192. The request for additional hash information is a request for hash information associated with the individual e-mail message records. The additional hash information is requested for each e-mail record of the e-mail messages marked as saved at the portable electronic device 22. After generation of the request for additional hash information, the request is then transmitted to the portable electronic device 22 at step 194.

Once the request for additional hash information is received at the portable electronic device 22 at step 196, each record hash generated at step 174 is transmitted to the communication system 20 over the radio communication channel at step 198.

The additional hash information is received at the communication system 20 and delivered to the server 32 at step 200. In response to receipt of the requested additional hash information, each hash generated for each of the saved e-mail message records at step 174 is compared with a corresponding one of the locally generated hashes generated at step 182 (step 202) and a determination is made as to which of the saved e-mail message records, requires restoring. Thus, e-mail message records that are not present in the saved messages list on the portable electronic device 22 but are present in the backup/restore table and e-mail message records in the backup/restore table that differ from those records at the portable electronic device 22 are transmitted to the portable electronic device 22 at step 204. These e-mail message records are received at the portable electronic device 22 at step 206 and at step 208, the processor 40 of the portable electronic device 22 determines for each e-mail message record received, whether or not the e-mail message record exists in the saved messages list. If the e-mail message record does not exist in the saved messages list, the processor 40 of the portable electronic device 22 determines at step 210 whether or not the e-mail message record exists in the list of e-mail messages (shown in FIG. 6). If the e-mail message record does not exist in the list of e-mail messages, the e-mail message is saved in the collection of e-mail messages marked as saved for which the parent e-mail message has been deleted (step 212), thereby restoring the e-mail message to the portable electronic device 22. If, on the other hand, the e-mail message record does exist in the list of e-mail messages, the e-mail message is marked as saved by changing the bit flag on the e-mail as referred to above (step 214). Thus, the e-mail message is again marked as saved at the portable electronic device 22.

If at step 208, it is determined that the e-mail message record does exist in the saved messages list, the e-mail record present in the backup/restore table is compared to the e-mail message record at the portable electronic device 22. If the size of the e-mail message record is greater at the backup/restore table than that at the portable electronic device 22, the processor proceeds to step 212 and saves the e-mail message in the collection of e-mail messages marked as saved for which the parent e-mail message has been deleted. If, on the other hand, the size of the e-mail message record is greater at the portable electronic device 22 than that at the backup/restore table, then the e-mail message record is transmitted from the portable electronic device 22 for delivery to the server 32 for overwriting to update the backup/restore table at step 218. The e-mail message record is received at the server 32 at step 220 and the backup/restore table is updated at step 222. It will be appreciated that the size of the e-mail message at the portable electronic device 22 can be larger than the size of the e-mail message at the backup/restore table as a result of only portions of messages being transmitted to the portable electronic device 22 to reduce data transmission and reduce the memory required for storage of the messages. Thus, only a first portion of a large message is transmitted until the user requests more of the message. After the user requests more of the message, further message content is transmitted. When only a portion of the e-mail is received and the e-mail message is saved at step 106 of FIG. 4, for example, the portion that is received is transmitted at step 108 to the server 32 and stored at the backup/restore table. If the user later requests more of the message at the portable electronic device 22, further message content is transmitted to the portable electronic device 22 and the message at the portable electronic device 22 is larger than the message at the backup/restore table.

While the embodiments described herein are directed to particular implementations of the system and method for storage of electronic mail, it will be understood that modifications and variations to these embodiments are possible. For example, the time period for which a saved message is stored in the backup/restore database or in the portable electronic device can be limited. Also, e-mail messages can be separated into separate tables at the backup/restore database based, for example, on the folder that the e-mail occupies on the portable electronic device. Thus, e-mails from different folders on the portable electronic device are stored in different tables at the backup/restore database. E-mail messages can also be separated into separate tables at the backup/restore database based on the service from which the e-mail is forwarded to the portable electronic device. Thus e-mail messages originally addressed to two different e-mail addresses that are forwarded to the same portable electronic device are saved in two separate tables at the backup/restore database.

In the embodiments described above, the portable electronic device transmits the saved e-mail messages to the communication system for storage by the server in the backup/restore database. It is contemplated, however, that a unique identification of the e-mail message can be transmitted so that, upon receipt by the server, the server retrieves the e-mail message from the Exchange™ database 39. If, however, the e-mail message cannot be retrieved, the server then requests transmission of the e-mail message from the portable electronic device. Advantageously, this reduces the amount of data transmitted wirelessly. Also, rather than the portable electronic device performing the size comparison of e-mail messages as described in relation to step 216, the portable electronic device can transmit a size of the e-mail message record when the record hash is transmitted for delivery to the server. Thus, the size comparison is carried out by the server and the e-mail message is not transmitted to the portable electronic device until it is determined that the message is to be transmitted for storage at the portable electronic device.

It will be appreciated that the components of the portable electronic device are shown in FIG. 2 for exemplary purposes only. Other portable electronic device components are possible. For example, rather than a trackwheel 49, as shown in FIG. 2 and referred to in the above description, the portable electronic device 22 can include a trackball. The trackball can be depressed as a means to provide additional user-input. The microprocessor 40 receives input from the trackball which is used for user selection of features from a list or a table on the LCD display 50 of the portable electronic device 22. Selection is carried out by rolling the trackball to roll a cursor (or highlighted region), for example, to the desired selection and pressing inwardly on the trackball. The portable electronic device 22 also includes other features, such as a battery, that are not shown.

According to one aspect, there is provided a method of storage of an e-mail that includes either receiving the e-mail at a portable electronic device or sending the e-mail from the portable electronic device. The e-mail is marked for saving at the portable electronic device and transmitted by radio communication for receipt by a server and for storage of the e-mail in a backup database.

According to another aspect, there is provided a portable electronic device that includes a receiver and transmitter for receiving and transmitting an e-mail; a display for displaying the e-mail; a user input for marking the e-mail for storage; a memory for storage of the e-mail; and a processor coupled to the receiver, the display, the user input and the memory. The processor causes the transmitter to transmit the e-mail by radio communication for receipt by a server and storage of the e-mail in a backup database, in response to the e-mail being marked for storage.

According to another aspect, there is provided a computer-readable medium having computer-readable code embodied therein, for execution by a processor, for receiving an e-mail at a portable electronic device or sending the e-mail from the portable electronic device, marking the e-mail for saving, at the portable electronic device, and transmitting the e-mail by radio communication for receipt by a sever and for storage of the e-mail in a backup database.

Advantageously, electronic mail messages stored at a portable electronic device can be saved such that saved e-mail messages are not subject to memory management operations or clean-up operations. Thus, these e-mail messages are retained in memory at the portable electronic device. The e-mail messages are also backed up in a backup/restore database so that the saved e-mail messages can be restored to the portable electronic device if ever they are lost from the device memory.

Many modifications and variations may occur to those skilled in the art. All such modifications and variations are believed to be within the sphere and scope of the present application.

What is claimed is:

1. A method of storage of an e-mail comprising:
one of receiving the e-mail at a portable electronic device and sending the e-mail from the portable electronic device;
marking the e-mail for saving at the portable electronic device, to avoid deletion of the e-mail from a memory of the portable electronic device during a memory management operation, for at least a period of time; and
responsive to marking the e-mail for saving, transmitting the e-mail by radio communication for receipt by a server and for storage of the e-mail in a backup database.

2. The method according to claim 1, wherein marking the e-mail comprises receiving an input for marking the e-mail and, in response, changing an e-mail storage status.

3. The method according to claim 2, wherein marking the e-mail for saving comprises providing an indicator on the e-mail, in response to receipt of the input, to thereby change the e-mail storage status.

4. The method according to claim 3, wherein providing said indicator comprises changing a bit flag on the e-mail in response to receipt of the input to thereby change the e-mail storage status.

5. The method according to claim 1, comprising receiving the e-mail at the server and storing the e-mail in a backup database.

6. The method according to claim 5, wherein storing the e-mail in the backup database comprises storing the e-mail in a table.

7. The method according to claim 1, comprising synchronizing the backup database with the portable electronic device after a memory loss at said portable electronic device.

8. The method according to claim 7, wherein synchronizing the backup database with the portable electronic device comprises restoring the e-mail to the portable electronic device after loss of the e-mail at the portable electronic device.

9. The method according to claim 7, wherein synchronizing the backup database with the portable electronic device comprises comparing a size of the e-mail from the portable electronic device with a size of the e-mail the backup database and, if the e-mail at the backup database is determined to be smaller in size than the e-mail at the portable electronic device, transmitting the e-mail from the portable electronic device for storage in the backup database.

10. The method according to claim 7, wherein synchronizing the backup database with the portable electronic device comprises comparing a size of the e-mail from the portable electronic device with a size of the e-mail at the backup database and, if the e-mail at the backup database is determined to be larger in size than the e-mail at the portable electronic device, saving the e-mail from the backup database, at the portable electronic device.

11. The method according to claim 7, wherein synchronizing the backup database with the portable electronic device comprises determining whether or not the e-mail message exists in a list of messages at the portable electronic device and, if so, marking said e-mail message as saved.

12. The method according to claim 11, wherein if said e-mail message does not exist in said list of messages, saving said message at said portable electronic device.

13. The method according to claim 11, wherein if said e-mail message does not exist in said list of messages, saving said message in a collection of e-mail messages marked as saved for which a parent e-mail message has been deleted.

14. A portable electronic device comprising:
- a receiver and transmitter for receiving or sending an e-mail;
- a display for displaying the e-mail;
- an input device for receiving an input for marking the e-mail for saving to avoid deletion of the e-mail from a memory of the portable electronic device during a memory management operation, for at least a period of time;
- a memory for storage of the e-mail; and
- a processor coupled to the receiver, the display, the input device and the memory and operable to cause the transmitter to transmit the e-mail by radio communication for receipt by a server and storage of the e-mail in a backup database, in response to the e-mail being marked for saving.

15. A non-transitory computer-readable medium having computer-readable code embodied therein for execution by a processor, the computer-readable code for:
- one of receiving an e-mail at a portable electronic device and sending the e-mail from the portable electronic device;
- marking the e-mail for saving at the portable electronic device, to avoid deletion of the e-mail from a memory of the portable electronic device during a memory management operation, for at least a period of time; and
- responsive to marking the e-mail for saving, transmitting the e-mail by radio communication for receipt by a server and for storage of the e-mail in a backup database.

* * * * *